(12) United States Patent
Gaudiano et al.

(10) Patent No.: US 8,086,351 B2
(45) Date of Patent: Dec. 27, 2011

(54) METHODS AND SYSTEMS FOR AREA SEARCH USING A PLURALITY OF UNMANNED VEHICLES

(75) Inventors: Paolo Gaudiano, Essex, MA (US); Benjamin Shargel, New York, NY (US); Eric Bonabeau, Winchester, MA (US)

(73) Assignee: Icosystem Corporation, Cambridge, MA (US)

( * ) Notice: Subject to any disclaimer, the term of this patent is extended or adjusted under 35 U.S.C. 154(b) by 1437 days.

(21) Appl. No.: 11/052,386

(22) Filed: Feb. 7, 2005

(65) Prior Publication Data

US 2006/0085106 A1    Apr. 20, 2006

Related U.S. Application Data

(60) Provisional application No. 60/542,744, filed on Feb. 6, 2004.

(51) Int. Cl.
*G05B 19/04* (2006.01)
*G05B 19/18* (2006.01)

(52) U.S. Cl. ........ 700/253; 700/245; 700/246; 700/247; 700/248; 700/249; 700/250; 700/254; 700/255; 700/258; 700/259; 701/1; 701/2; 701/3; 701/11; 701/120; 701/121; 701/122

(58) Field of Classification Search ..................... 701/23, 701/2, 3, 11, 209, 210, 300, 24, 25, 26, 202; 244/76 R, 175
See application file for complete search history.

(56) References Cited

U.S. PATENT DOCUMENTS

| | | | |
|---|---|---|---|
| 5,521,817 A | 5/1996 | Burdoin et al. | |
| 5,728,965 A | 3/1998 | Fesland et al. | |
| 7,546,187 B2 * | 6/2009 | Bodin et al. | 701/26 |
| 2002/0143461 A1 * | 10/2002 | Burns et al. | 701/117 |
| 2002/0165649 A1 * | 11/2002 | Wilhelm Rekow et al. | 701/26 |
| 2004/0030449 A1 * | 2/2004 | Solomon | 700/245 |
| 2004/0068351 A1 | 4/2004 | Solomon | |
| 2004/0193334 A1 * | 9/2004 | Carlsson et al. | 701/9 |
| 2005/0004723 A1 * | 1/2005 | Duggan et al. | 701/24 |
| 2005/0075785 A1 * | 4/2005 | Gray et al. | 701/202 |
| 2005/0165516 A1 * | 7/2005 | Haissig et al. | 701/4 |
| 2006/0074557 A1 * | 4/2006 | Mulligan et al. | 701/213 |
| 2006/0085106 A1 * | 4/2006 | Gaudiano et al. | 701/23 |
| 2006/0089764 A1 * | 4/2006 | Filippov et al. | 701/23 |
| 2006/0114324 A1 | 6/2006 | Farmer et al. | |

OTHER PUBLICATIONS

International Search Report for PCT/US05/03773.

* cited by examiner

*Primary Examiner* — Khoi Tran
*Assistant Examiner* — Bhavesh V Amin
(74) *Attorney, Agent, or Firm* — Morse, Barnes-Brown & Pendleton, P.C.; Sean D. Detweiler, Esq.

(57) ABSTRACT

Disclosed are methods and systems that include a method for controlling movement of a first unmanned vehicle (UV) to search an area, where the method includes generating a first trace associated with prior positions in which the first UV has been located, determining a direction in which the first UV is to move using the first generated trace, and causing the first UV to move in the determined direction. The trace may be a numerical value that decreases as a function of the time that has elapsed since the first trace was generated. The methods and systems may also include receiving data relating to a second trace, and using that second trace to determine the direction. The second trace may be generated by a second UV. The second trace may be associated with a position within a predetermined radius from a position associated with the first UV.

32 Claims, 7 Drawing Sheets

METHODS AND SYSTEMS FOR AREA SEARCH USING A PLURALITY OF UNMANNED VEHICLES

CROSS REFERENCE TO RELATED APPLICATIONS

This application is related to and claims the benefit of U.S. Provisional Application Ser. No. 60/542,744, filed on Feb. 6, 2004, and entitled "Methods and Systems for Area Search Using a Plurality of Unmanned Vehicles", the content of which is hereby incorporated by reference in its entirety.

GOVERNMENT INTEREST

This invention was made by an agency of the United States Government, or under contract with an agency of the United States Government. The name of the United States Government agency and the Government contract number are: Air Force Research Laboratory; contract number F33615-02-M-3232.

FIELD

The disclosed methods and systems relate generally to control of an unmanned vehicle and more specifically control of a plurality of unmanned vehicles for searching an area containing stationary or moving targets.

BACKGROUND

Unmanned vehicles (UVs) are vehicles which may carry sensory, computational and communications or other payloads, but no on-board human pilot. This can include unmanned ground vehicles (UGVs), unmanned air vehicles (UAVs) or unmanned underwater vehicles (UUVs). Unmanned vehicles may be used to perform tasks in which the presence of a human pilot is undesirable or unfeasible. For example, UVs can be used by military forces in combat scenarios in order to avoid or minimize human casualties.

One application of unmanned vehicles is in searching an area containing static or moving targets. This task requires that one or more unmanned vehicles carry a sensor able to detect the particular target being sought. To reduce search time and improve performance when the search area is large relative to the range of a single unmanned vehicle, it may be desirable to deploy a plurality of unmanned vehicles that can carry out the search in a collaborative fashion.

Prior attempts to control a plurality of unmanned vehicles often have relied on predefined motion patterns, such as commanding each unmanned vehicle to cover one particular portion of the search area. Such approaches tend to be brittle: failure of a single unmanned vehicle may result in portions of the area remaining unsearched. Furthermore, such control schemes may not adapt well to changing conditions, such as the presence of moving targets, or changes in the search area resulting from available intelligence. Additionally, because such control schemes often have to be centralized (i.e., the movement of the vehicles is controlled from a single location), such approaches may lead to rapid increases in the communication bandwidth requirements, and in the complexity of the controlling schemes.

SUMMARY

The disclosed methods and systems employ trace-based (also referred to as "pheromone-based") communications and control schemes to cause one or a plurality of unmanned vehicles to search for stationary or moving targets within a search area.

In one embodiment, a plurality of unmanned vehicles may be equipped with: sensors to detect stationary or moving targets, a communication apparatus to exchange information with a ground station or other central command unit, and an on-board computer or processor able to store and retrieve data. The vehicles may be equipped with components, such as, e.g., weapons for use against the search targets, or equipment to be delivered to the targets.

Each unmanned vehicle may communicate with the central command unit, transmitting information regarding the portions of the search area it has searched since its last communication with the central command unit. The central command unit may collect such data from all unmanned vehicles, storing it into a local map or database representing the search area. The trace transmitted by each unmanned vehicle is referred to as pheromone, as it simulates the way in which insects and other animals may leave a chemical marker to indicate locations they have visited. The trace represents the area searched by the vehicle. The central command unit may transmit back to each unmanned vehicle data representing the distribution of traces in the unmanned vehicle's immediate surroundings. The unmanned vehicle may modify its flight path to move preferentially toward portions of the search area that are not covered or are less covered by pheromone from prior search activity.

The disclosed systems and methods may include a method for controlling movement of a first unmanned vehicle (UV) to search an area, including generating a first trace associated with prior positions in which the first UV has been located, determining a direction in which the first UV is to move using the first generated trace, and causing the first UV to move in the determined direction.

In some embodiments, determining the direction may include establishing a new position toward which the first UV is to move. Causing the first UV to move may include causing the first UV to move toward the new position. In some embodiments the disclosed method may include receiving data relating to a second trace. Determining the direction may include using the second trace. The second trace may be generated by a second UV. The second trace may be associated with a position within a predetermined radius from a position associated with the first UV.

In some embodiments, the first trace may include information regarding spatial coordinates of the UV, time at which the first trace was generated, and/or the identity of the UV. The first trace may also represent conditions at the associated prior positions. Such conditions may include detected threats, and/or detected targets.

In some embodiments, the method may include generating an additional trace associated with additional positions. The additional trace may indicate that the additional positions have been searched. In some embodiments the first trace is a time-varying digital signal. The digital signal may include a numerical value that decreases as a function of the time that has elapsed since the first trace was generated.

In some embodiments, determining the direction may include identifying an unsearched position that is not associated with any trace. Determining the direction may also include identifying a position associated with one or more traces which indicate that that position was not searched by a UV for a pre-determined period of time. Determining the direction may be further based on a decentralized control strategy, which may include, for example, baseline strategy, random strategy, repulsion strategy, and/or global strategy.

Determining the direction may further be based on responding to a request from a second UV to join that UV.

In some embodiments, the disclosed systems and methods may include transmitting the generated trace to a central operator. Data relating to the second trace may thus be received from the central operator. The disclosed systems and methods may also include attacking a target found in the search, tracking the target, and/or assessing the condition of the target.

In some embodiments the disclosed unmanned vehicle may be an airborne vehicle and may include a propulsion mechanism having independent pitch and yaw control that enables the UV to move in the area at variable speed, a detector to detect targets, a positioning device to determine that spatial position of the UV, a communications module for transmitting information associated with the generated trace, and for receiving data corresponding to the traces generated by at least one other UV, and/or a processor unit to determine the direction of the UV.

Also disclosed is a method for controlling movement of a plurality of unmanned vehicles (UVs) to search an area. The method may include generating traces associated with at least some of the UVs, where each of the traces is associated with prior positions at which the corresponding UV has been located, transmitting to at least some of the UVs data associated with at least some of the generated traces associated with other UVs, determining a direction in which the corresponding UV is to move using at least some of the transmitted data and the trace associated with that UV, and causing that UV to move in the corresponding determined direction.

Also disclosed is a system for controlling movement of a first unmanned vehicle (UV) to search an area that includes a trace generator for generating a first trace associated with prior positions in which the first UV has been located, and a navigation module for determining a direction in which the first UV is to move using the first generated trace, and for causing the first UV to move in the determined direction.

Further disclosed is a system for searching an area that includes a plurality of unmanned vehicles (UVs), where each of the UVs includes a trace generator for generating traces associated with the corresponding UV, each of the traces associated with prior positions at which that corresponding UV has been located, communications transmitter for transmitting some of the UVs data associated with at least some of the generated traces that are associated with the UV and receiving data associated with at least some of the generated traces associated with the UVs, and a navigation module for determining a direction in which the corresponding UV is to move using at least some of the transmitted data and the traces associated with that UV, and for causing that UV to move in the corresponding determined direction.

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

Figure 1:
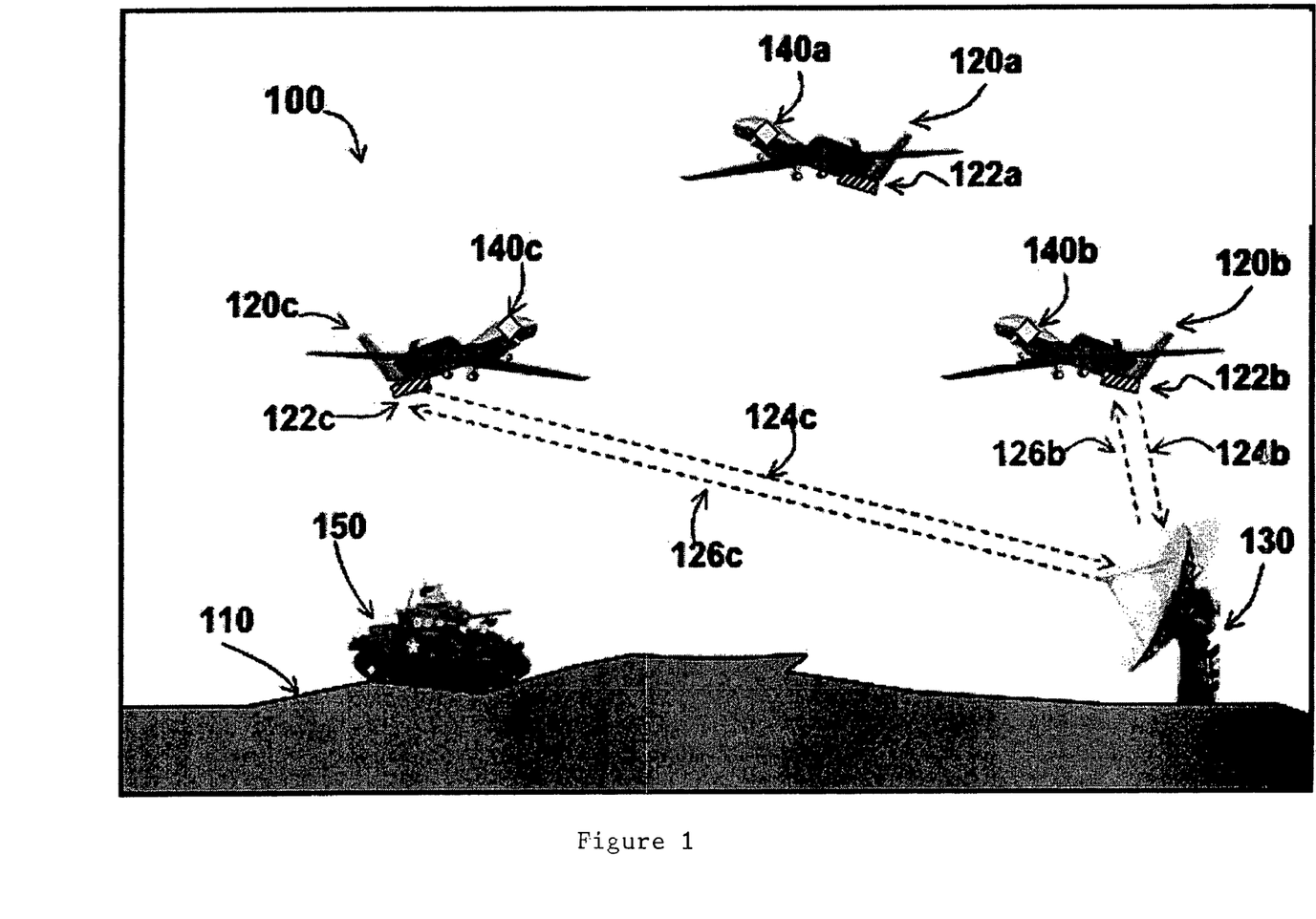
FIG. 1 is a schematic diagram of one embodiment of a system for searching an area using a plurality of UAVs.

FIG. 1 shows an exemplary embodiment of a system 100 for searching an area 110. The system 100 includes a plurality of unmanned vehicles (UVs) 120a-c. Although only three unmanned vehicles are shown, it will be readily understood that fewer or more unmanned vehicles may be used with the system shown in FIG. 1. As shown, each of the UVs 120a-c is an unmanned air vehicle (UAV), such as any commercially available UAV, or UAVs used militarily. Such UAVs are well familiar to those versed in the art. It will further be understood that while FIG. 1 shows the unmanned vehicles as air vehicles, other types of unmanned vehicles, including, for example unmanned ground (UGVs) or underwater vehicles (UUVs) may equally be used with the methods and systems described herein.

As shown in FIG. 1, the UAVs 120a-c may be used to search the area 110 to survey the terrain, detect targets such as target 150, attack detected targets, or perform any other type of mission, either alone or in coordinated collaboration with other UAVs deployed over the searched area. As will be well understood by those versed in the art, UAVs such as those shown in FIG. 1 may comprise the following components:

a) Propulsion and navigation mechanisms (not shown in FIG. 1) with independent pitch and yaw control to enable the UAVs to move over the searched area at variable speed and altitude.
  b) A sensor for detecting targets (not shown in FIG. 1). In one embodiment, such a sensor may be, for example, a forward looking, cone shaped ground sensor with adjustable radius and angular aperture suitable for detecting terrain and possible targets. Such a sensor may be a stochastic sensor, whereby the probability of detecting a target is dependent on the distance, elevation, and the amount of time spent flying over a given terrain locale.
  c) A sensor, such as, for example, a circular sensor, to detect the presence of UAVs within a prescribed (or adjustable) radius may also be used with one or more of the UAVs 120a-c.

d) A GPS device that enables the determination of a UAV's spatial position may also be used with any of the UAVs 120*a-c*.

Many other types of sensors/detectors may also be used with any of the UAVs 120*a-c*.

Figure 7:
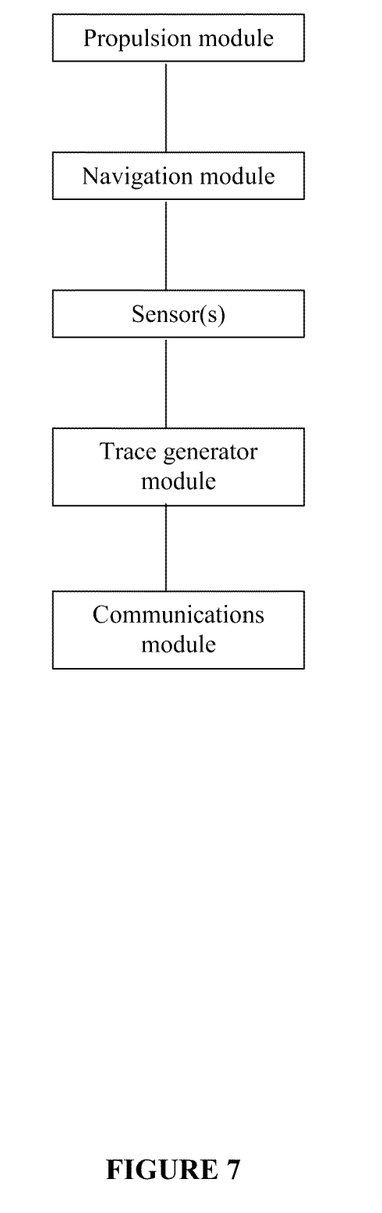
FIG. 7 is a schematic illustrating the components of one embodiment of a UAV as disclosed herein.

FIG. 7 is a schematic illustrating a configuration of the modules in one embodiment of a UAV as disclosed herein.

As can be seen in FIG. 1, each of the UAVs 120*a-c* may also be equipped with a trace generator module 140*a-c*. As will become apparent below, a trace generator module may generate traces (also referred to as "pheromones") that indicate that the positions associated with the traces had been visited, and thus searched. Additionally, the trace generator module may also generate traces associated with positions within the area covered by the various on-board sensors of the UAV. Because different on-board sensors may have different search characteristics, they may generate different traces. The traces generated by the UAV, as well as data received by the UAV regarding traces generated by other UAVs, may be used to determine the UAV's future course. In other words, every UAV may use the trace information, among other things, to independently determine the path that the UAV will follow as it explores, alone or in collaboration with other UAVs, the area 110 in which the UAV is deployed. The UAVs 120*a-c* thus may use the generated trace(s) to mark the territory, in a somewhat analogous manner to the way insects mark their territory with pheromones, so that the UAVs may subsequently utilize these markers to, at least partly, determine the direction that they are to follow in carrying out a future search.

Each of the trace generator modules 140*a-c* may be coupled to the array of sensors placed on board the UAVs, including, for example, the GPS sensor, the target detector, and UAV sensors described herein, as well as any other sensors that may be placed on the UAVs. The trace generator modules 140*a-c* may receive signals and data from the various sensors to which they are coupled, and process the signals and data to generate traces associated with the UAVs' current positions and/or with positions inside the areas covered by the sensors. The trace generator module may be a special purpose device, or it may be a type of processor-based device suitable for multiple applications and comprising volatile and non-volatile memory elements, peripheral devices to enable input/output functionality, including, for example, a CD-ROM drive and/or floppy drive or a network connection, for downloading software containing computer instructions to enable general operation of the trace generator module 140*a-c*, as described herein, and for downloading software implementation of a trace generating program. Such a processor-based device may be dedicated exclusively to trace generation or may also be utilized to carry out other functions as well. Each of the trace generator modules 140*a-c* may also comprise additional control circuitry, modules, and/or other components that may be required for implementation of the modules as described herein. As will further be appreciated by the person skilled in the art, the trace generators 140*a-c* may be one of many commercially available computer systems that may adapted to be housed in unmanned air vehicles such as the UAVs 120*a-c*.

Generated traces may not only indicate that their associated positions have been searched, but may also be representative of the attributes and conditions at those positions. The attributes and conditions represented by the generated traces may include, for example, the spatial coordinates of the positions, the time at which the traces were generated, the identity of the UAVs that generated the respective traces, detected threats, including for example, other UAVs that are deemed to be situated too closely to the UAV generating the trace, detected targets in the area, the lighting conditions, the weather or cloud cover in the area, and the characteristics of the sensor(s) generating the trace. Those of ordinary skill in the art will appreciate that the generated traces may be further representative of other types of conditions and attributes present at or around the position at which the corresponding UAV is located.

In one embodiment the traces generated by the various trace generator modules may comprise digital signals that encode the information captured by each UAV's sensors. The individual trace generator modules may, for example, combine the outputs of the various on-board sensors to produce composite values, or metrics, that represent the attributes and conditions at the associated positions, and indicate, for example, that the positions had been searched. Thus, for example, the trace generator may generate a particular value if it the target detector on-board the UAV detected three targets within the vicinity of the UAV, and would produce a different value (which may be higher or lower) if only a single target is detected. Additionally, in some embodiments the generated traces may vary over time. For example, the generated trace may decrease in value over time to emulate the evaporative properties of biological pheromones. As will become apparent below, time varying trace signals may be useful in situations where the positions in the searched area have to be re-visited to determine whether targets attempting to evade detection by the cluster of UAVs have moved to those positions that have already been visited by one or more of the UAVs. Thus, time varying trace signals reflect the fact that conditions at particular positions may become unknown over time notwithstanding the fact that those particular positions had been previously visited.

As also shown in FIG. 1, each UAV may also include a communications module 122*a-c* capable, for example, of transmitting traces generated by the corresponding UAV, and receiving data corresponding or relating to traces produced by other UAVs, either directly from the other UAVs, or from a central operator 130 that collects trace data from UAVs deployed in the area 110, and relays that data, or a processed version thereof, to other UAVs. As will be appreciated, the communications modules may be any known transmitter/receiver apparatus, and may include communications devices operating at any operable frequency band (e.g., radio-frequency, microwave frequency, optical bands, etc.) that those of ordinary skill may be familiar with. Additionally, transmission of the trace signals may be performed using any known coding and/or modulation technique. Likewise, reception of traces and/or corresponding data may be performed using corresponding demodulation and/or decoding techniques.

Thus, the communications modules 122*a-c* enable each UAV to emit its traces so that other UAVs would be able to sense them, and to thereby determine their motion path based, at least partly, on the sensed traces. Each communications module may, therefore, broadcast the traces generated by the corresponding UAV to other UAVs in the cluster. Alternatively, or in addition, each communications module 122*a-c* may transmit the traces to the central operator 130.

Central operator 130 may comprise any conventional communications and/or data processing apparatus capable of receiving traces sent by UAVs and decoding them. Such communications apparatus may likewise be capable of transmitting data to, among others, UAVs deployed in the area 110, after performing any appropriate pre-transmission signal processing, including, for example, signal encoding and modulation. Central operator 130 may further comprise a processing module (not shown) for processing the trace information received from the UAVs. As such, the processing module of central operator 130 may be, for example, a special purpose device, or it may be a processor-based device suitable for multiple applications and comprising volatile and non-volatile memory elements, peripheral devices to enable input/output functionality, including at least one peripheral device, such as a CD-ROM drive and/or floppy drive, or network connection for downloading software containing computer instructions to enable general operation of the central operator 130, as described herein, and for downloading software implementation of a central operator program. Such a processor-based device may be dedicated exclusively to trace information processing, or may also be used to carry out other functions as well. The processing module of the central operator may also comprise additional required control circuitry, modules, and/or other components that may be needed for implementation of the processing module. As will further be appreciated by those skilled in the art, such a processing module may be one of many commercially available computer systems, and may be configured as a stand-alone workstation, or as a node or a server in a local or wide area network, partly or wholly responsible for processing the data received from UAVs. It will also be appreciated that although the central operator 130 is shown in FIG. 1 as being located in area 110, the actual location of the central operator may be outside the area, and that in fact the central operator may be housed on a mobile platform, such as, for example, one of the UAVs deployed in the area.

The central operator 130 may collect information from one, some, or all of the UAVs deployed in the area 110. As shown in FIG. 1, the central operator 130 may receive, for example, transmissions 124b and 124c from UAV 120b and 120c respectively. The information received, which may include, for example, traces generated by trace generator modules 140b and 140c, may be stored on the processing module of the central operator 130 as a matrix, wherein each cell in the matrix may correspond to a position in the searched area. Alternatively, multiple cells may be utilized to represent one position with each cell storing one characteristic of the position. The information stored in the matrix may be the actual transmitted traces, or may be a numerical value, or values, computed from the traces transmitted by the UAVs. The information stored in the matrix may indicate which positions in the searched area have been visited, and may further represent the attributes and conditions at the positions associated with the traces.

On a regular basis, or whenever communication is possible, the central operator may transmit data back to one, some, or all of the UAVs deployed in area 110. For example, as shown in FIG. 1, the central operator 130 may transmit data message 126b to UAV 120b, and data message 126c to UAV 120c. In one embodiment, UAVs may receive from the central operator information about the area immediately surrounding the UAV at its current location. For example, if the UAV is currently located at position x,y within the search area, the central operator may send a small matrix of information representing the amount of coverage for all cells whose coordinates are within a fixed distance (i.e., some pre-determined radius) of the x,y coordinates of the UAV. Alternatively, in another embodiment, the central operation may send to the UAVs data regarding not only the amount of coverage of positions within the entire searched area, but also information regarding additional attributes and conditions at those positions that may be relevant for the determination of the path the respective UAVs are to follow (e.g., information about threats, locations of targets, etc.).

The amount of data transmitted to each UAV may be adjusted as a function of: (1) available communications bandwidth; (2) time since the last communication with a particular UAV; (3) speed of the UAV; and other factors that impact the amount of information required by the UAVs.

As noted, each UAV may receive data, including, for example, data corresponding to traces generated by at least one other UAV, and may use the data to influence its movement. In one example, each UAV may consider all cells or locations within a small area around its current location. In another example, each UAV may receive all the data maintained by the central operator 130, and may use that information to determine a general direction, represented, for example, as a vector, or to determine a second position to which the UAV should move. Each UAV may also use its own generated trace data to determine the path (e.g., the flight path) that it is to follow. It will be understood that these direction determinations (computations) may be re-performed by the UAVs at regular time intervals, and/or after the UAVs have advanced or moved a predetermined distance in the previously determined directions.

Determination of the direction that each UAV is to follow (e.g., determining a second position to which the UAV should move from its current location) may be performed, for example, by a navigation module (not shown) that may also be implemented as a special purpose or processor-based device comprising volatile and non-volatile memory elements, peripheral devices, and other control circuitry. The navigation module may form part of either the trace generator module, or the communications module, or may be a separate processor-based module. The navigation module of a particular UAV may be coupled directly or indirectly to the UAV's propulsion and control/or mechanism, and may thus control the UAV's movement within the area 110.

In determining the path the UAV is to follow, in one embodiment each UAV, or more particularly the respective navigation module, may use the received data, as well as the traces generated by that UAV, to identify those positions, either within a pre-determined radius from the coordinates of the UAV, or within the entire area 110, that have the least amount of coverage, or that for other reasons (such as the expected locations of many targets or high value targets) may represent the most fruitful future search for it. For example, if a high numerical value of a trace indicates that the associated position had been visited by some UAV, or that the sensors on board that UAV had covered that position, then the navigation module may direct the UAV to move toward other positions associated with traces having lower numerical values since those positions are represented as not having been searched, or not having been adequately searched. In addition, in a further elaboration of the scheme, the module may take into account the availability of other UAVs to search a given area.

Figure 6:
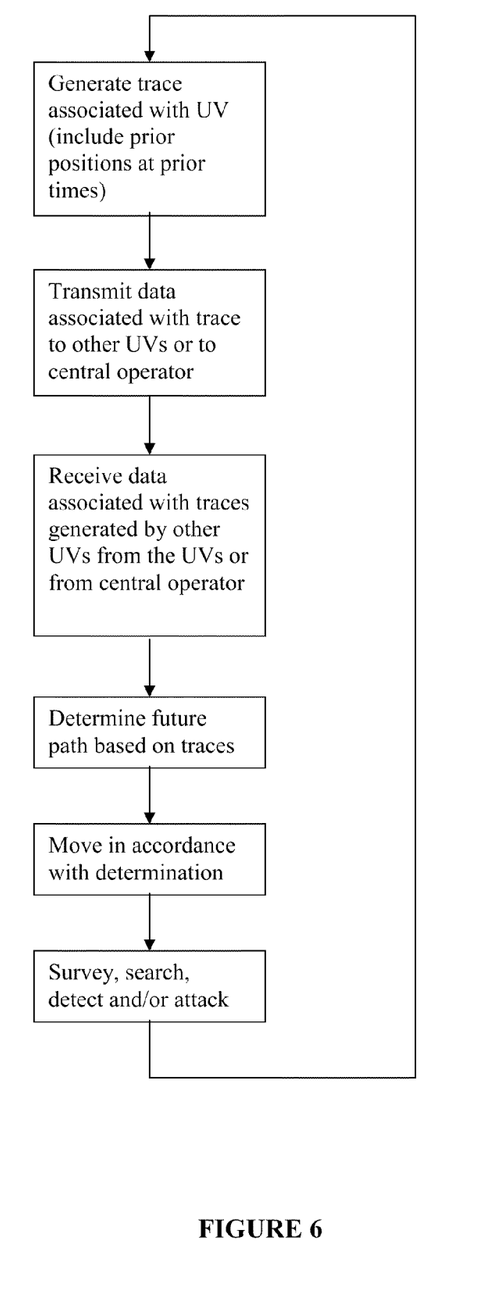
FIG. 6 is a flow chart setting forth one embodiment of a method disclosed herein.

FIG. 6 is a flow chart setting forth one embodiment of the methods disclosed hereinabove.

A different scheme for determining the movement of UAVs may utilize a global search strategy. Under that scheme the area 110 may be divided into, for example, an N×N grid, where each cell in the grid may correspond to a sector of the area 110. The navigation module of a particular UAV may then monitor the UAV coverage inside every sector by, for example, calculating a value for each sector based on the number and values of traces inside the respective sector, the number of UAVs in the sector, and whether other UAVs are heading for the sector being monitored. The computed value for each sector being considered by the particular UAV may then be compared to the computed value for the sector in which the particular UAV is currently located. Such a comparison may, for example, be performed by calculating the difference between the two values. If the computed difference exceeds a threshold value, the particular UAV may leave its current sector to proceed toward the sector in respect of which the difference value was computed. The global search strategy may be combined, for example, with a simpler local trace-based strategy such that a UAV may use the global strategy to determine what sector to search, and once located inside that sector may use another trace-based strategies, such as those described herein, to identify and search positions that have not been searched, or have not been adequately searched within the sector.

In another scheme a UAV may mathematically combine or process the spatial coordinates of positions not associated with a trace, such as by averaging them, and thereby compute a vector that indicates the direction to which the UAV should move.

It will be understood by those versed in the art that the determination of the direction or path a UAV is to follow (i.e., what positions within the area it is to visit) may be made based upon the underlying trace information using many different criteria and schemes of varying complexity and sophistication.

Additionally, the movement of one, some, or all of the UAVs may be based in whole or in part on decentralized control strategies (i.e., where each UAV independently controls its motion without an external agent or module controlling the movement of that UAV) used in conjunction with the trace-based (i.e., pheromone-based) strategies described herein. Thus, while control of UAV motion may still be based on the movement of UAVs toward positions in the area 110 that have not been adequately searched by the cluster of UAVs (as determined by the various schemes, described herein, that use the values of traces associated with those positions to identify positions not adequately covered), additional movement strategies based on simple rules may be used to facilitate a more effective coverage of the area 110 by the UAVs 120a-c. For example, some of these decentralized control strategies may include:

a) Baseline strategy—under this scheme, a UAV flies in a straight line until it reaches the boundary of the search area, at which time the UAV changes direction to avoid exiting the area.
  b) Random (also referred to as "jitter") strategy—under this scheme, the UAV changes its heading by a small random angle at regular time intervals. In one example, a random variation in the range of ±0-3'/sec may be used.
  c) Repulsion strategy—under this scheme, UAVs are equipped with sensors to sense other UAVs within a given radius (referred to as the "repulsion radius"), thereby enabling each UAV to maneuver so that other UAVs are kept outside that repulsion radius.

It will be understood by those skilled in the art that many other decentralized control strategies may be used.

In some embodiments UAVs 120a-c may be deployed to detect and/or attack targets in area 110, in addition to searching for them. In those embodiments, therefore, the movement of UAVs 120a-c may be affected by additional motion control strategies, or rules, that are intended to facilitate the UAVs' missions to detect and destroy targets. For example, since the targets that UAVs 120a-c seek may be moving targets that may attempt to evade detection by, for example, moving into positions that have been already visited by UAVs, it may be useful for the UAVs to return to areas already searched in order to determine if there have been changes in those positions. This may also be useful in searching for mobile targets globally, even if destroying them is not an objective. Accordingly, in some embodiments the trace generator modules 140a-c may generate time varying traces (i.e., pheromones) that decrease in value over time. The time-dependent decrease of the traces' values may reflect the fact that after a certain amount of time has passed since the associated position has been visited by a UAV, that position may be searched again to determine if a target has moved into that position (or the position's surrounding area) in the interim. Thus, for example, each of the traces generated by the UAVs deployed may include a time stamp. Subsequently, the central operator 130 and/or the UAVs that receive data from the central operator 130 may process the traces to cause their values to vary as a function of the time that has elapsed since the trace was generated (as indicated by the time-stamp). As the values of traces continue to vary over time, the trace-based strategies used by the UAVs will gradually start to favor those positions associated with the older traces, thereby causing the UAVs to be directed toward those positions again.

Furthermore, to detect and destroy targets, or merely to detect them, or interact with them in another way, the UAVs may be required to enter into states (i.e., modes) in which additional movement control rules are used. For example, the UAVs may enter the "Join" state, where one UAV joins another UAV that had recruited it. In this state the recruiting UAV may, for example, send a signal to at least one other UAV (or may send the signal via the central operator 130) that provides the at least one other UAV with the first UAV's coordinates, and requests that the at least one other UAV join it for seeking out and destroying a target(s).

In yet another example, the UAV may enter the "Track" state, in which a particular UAV detects a target, and subsequently begins tracking that target. In this situation, control of the UAV's movement is governed, at least to some extent, by the position of a detected target or targets.

In a further example, each UAV may enter an "Assess Damage" state, in which a UAV detects a target, and thereafter attempts to determine the status and/or condition of the target (e.g., has the target already been destroyed). This state is similar to the "Track" state.

In yet another example, each UAV may enter an "Attack" state, in which a UAV seeks to destroy its current target.

It will be understood by those of ordinary skill that other states, or modes, each having its own movement control rules, may be used.

In operation, a swarm of UAVs 120a-c may be deployed in an area 110. Each of the UAVs may be equipped with one or more of sensors including, for example, a GPS sensor or sensors to determine the UAV's spatial coordinates, a target sensor or sensors for detecting targets within the searched area, and a UAV sensor or sensors to determine if there are other UAVs in the surrounding area of a particular UAV. Additionally, each UAV may be equipped with a "pheromone sensor" or trace sensor which receives traces generated by other UAVs, and uses those traces, and traces individually generated by the particular UAV, to determine the direction in which the particular UAV should proceed. Such a pheromone or trace sensor may be a receiver adapted to receive electromagnetic transmissions sent by the deployed UAVs. The communications module 122a-c of system 100 shown in FIG. 1 may be used to receive traces generated by UAVs, and thus act as a "pheromone sensor".

Each UAV may employ its various on-board sensors to search the area 110 for targets, such as target 150, or simply to survey the characteristics of the area (e.g., the area's topography). As each UAV 120a-c searches the area, it may generate a trace, often referred to as "pheromone", to indicate that the particular position where the UAV is currently located had been searched. Such a trace may be a simple digital message represented as a numerical value. Further, since the sensors employed by UAVs may be capable of covering, or sweeping, an area that extends beyond the current position of a UAV, the UAV may generate a plurality of traces associated with positions covered by the UAV's respective sensors. Traces generated for those positions covered by the sensors (although not actually visited by the UAV) may be assigned different values than the values assigned for positions actually visited by the UAV. In addition, generated traces may also hold data representative of attributes and conditions at the positions visited by the UAV, or positions covered by the UAV's sensors. In situations where the UAV searches the area for moving targets, traces may be configured to have evaporative characteristics such that the traces may vary over time (e.g., have their values decreased). Such time dependent behavior may reduce the likelihood that multiple UAVs will fly over the same position within a short time window, but may leave open the possibility that a particular portion of the search area will be searched more than once, to avoid the possibility that moving targets will attempt to evade detection by hiding in places where UAVs already have searched. Traces may be generated, for example, by trace generator modules, such as modules 140a-c shown in FIG. 1.

Generated traces may be transmitted by the communications modules 122a-c of the respective UAVs 120a-c. In one example, the communications module, which as previously described may be any conventional transmitter/receiver apparatus capable of transmitting wireless communications or, in some circumstances, wired communications, may broadcast the traces so that all UAVs deployed in the area may receive the broadcast traces. Alternatively, in another example, the communications modules 122a-c may transmit generated traces to a central operator 130. The central operator may process and store the received traces. For example, received traces, or the data extracted from them, may be stored in a matrix-like data structure, in which data is stored in cells that correspond to the positions associated with the received traces.

The central operator 130 may, at regular intervals, or otherwise when UAVs are available to safely receive data, send data corresponding to the data stored at the central operator 130. The central operator may send copies of the actual traces it received, or otherwise send processed data to enable the UAVs receiving that data to individually and independently determine the course or path that they are to follow in searching the area 110. The volume of data sent to the UAV may depend on such factors as the transmission bandwidth available, security considerations (i.e., if complex encryption processing is required, it may be necessary to send less data). Furthermore, the central operator may transmit to each UAV only data pertaining to that UAV's immediate surrounding.

A UAV receiving data from either the central operator 130 or from one or more of the other UAVs may then determine the direction in which or the next position to which it should move based on at least one of the received data and trace information that that UAV itself generated. In one example the UAV may determine what positions, within a pre-determined radius, do not have a trace associated with them, and/or what positions, have not been adequately covered (for instance, those positions that lie on the fringes of areas covered by the UAV's sensors). The UAV may also, for example, mathematically combine or process the spatial coordinates of positions not associated with a trace, such as by averaging them, and thereby compute a vector that indicates the direction to which the UAV should move.

Many other different techniques and schemes for determining a path for the UAV are possible. Additionally, control of the UAV's movement may also be influenced by using other control strategies to govern the direction and/or position to which the UAV should move, including, for example, a baseline strategy, a global strategy, and/or random strategy. Further, the UAV may collaborate with other UAVs when the UAVs are deployed to seek out and/or destroy targets, and may thus enter into states (e.g., Track, Join, Attack) in which control of the UAV movement may be governed in whole or in part by other schemes that are not based on traces.

Once the UAV determines a direction in which and/or the next position toward which it should move, the navigation module directly or indirectly may control the UAV's propulsion and/or control mechanism to cause it to move in the desired direction or toward the next position.

Figure 2:
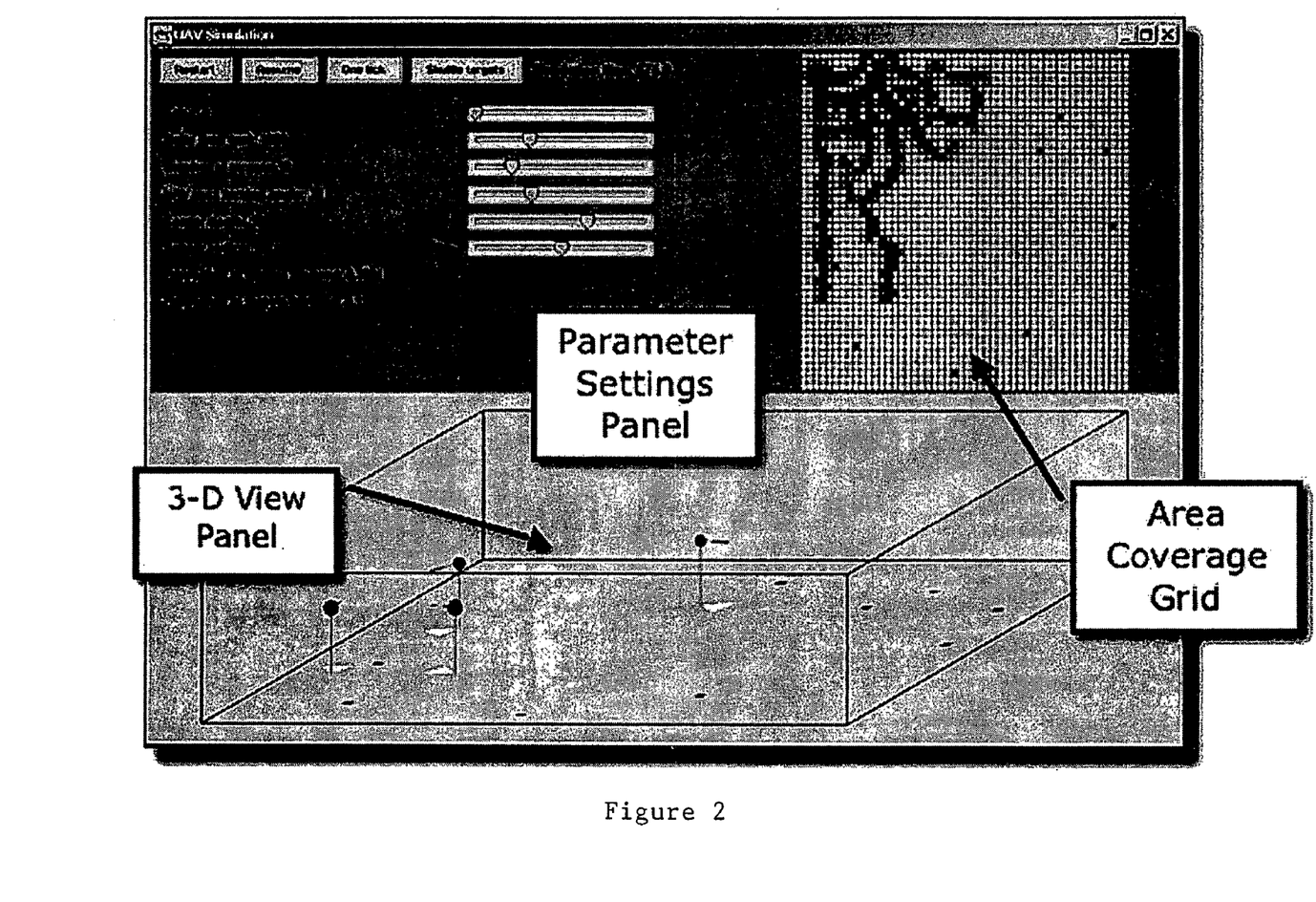
FIG. 2 is a screenshot of a UAV cluster simulator developed to test the performance of a system such as the one shown in FIG. 1.

To test the efficacy of trace-based strategies in comparison to other decentralized control strategies, a simulator capable of simulating the performance of UAV clusters was developed. FIG. 2 shows a screenshot of the UAV cluster simulator that was developed. The simulator was written in the Java language, and control of the parameters that were used in the simulation, such as the aspects of the terrain, trace characteristics, UAVs and targets, was done through the use of command-line instructions, GUI widgets, and built-in variables. As can be seen in FIG. 2, the simulator screen is divided into three areas. The top-left area includes various widgets to control aspects of the simulation in real time, such as pausing and restarting, shuffling targets randomly, or modifying the dynamics of the UAVs. The bottom area is a 3D view showing the boundaries of the terrain being searched (the black wireframe box). The UAVs are represented by circles, the triangles represent the UAVs' sensor coverage area, and the small dark spots at the lower part of the wireframe box are the targets. As can also be seen in FIG. 2, the altitude of the UAVs can be visualized through the vertical lines connecting the UAVs to the ground. Shown in the top-right area of FIG. 2 is a top-down matrix representation of the terrain, which shows the grid used to determine coverage, and the location of UAVs and targets. The traces may be represented as blocks of varying intensity.

Figure 3:
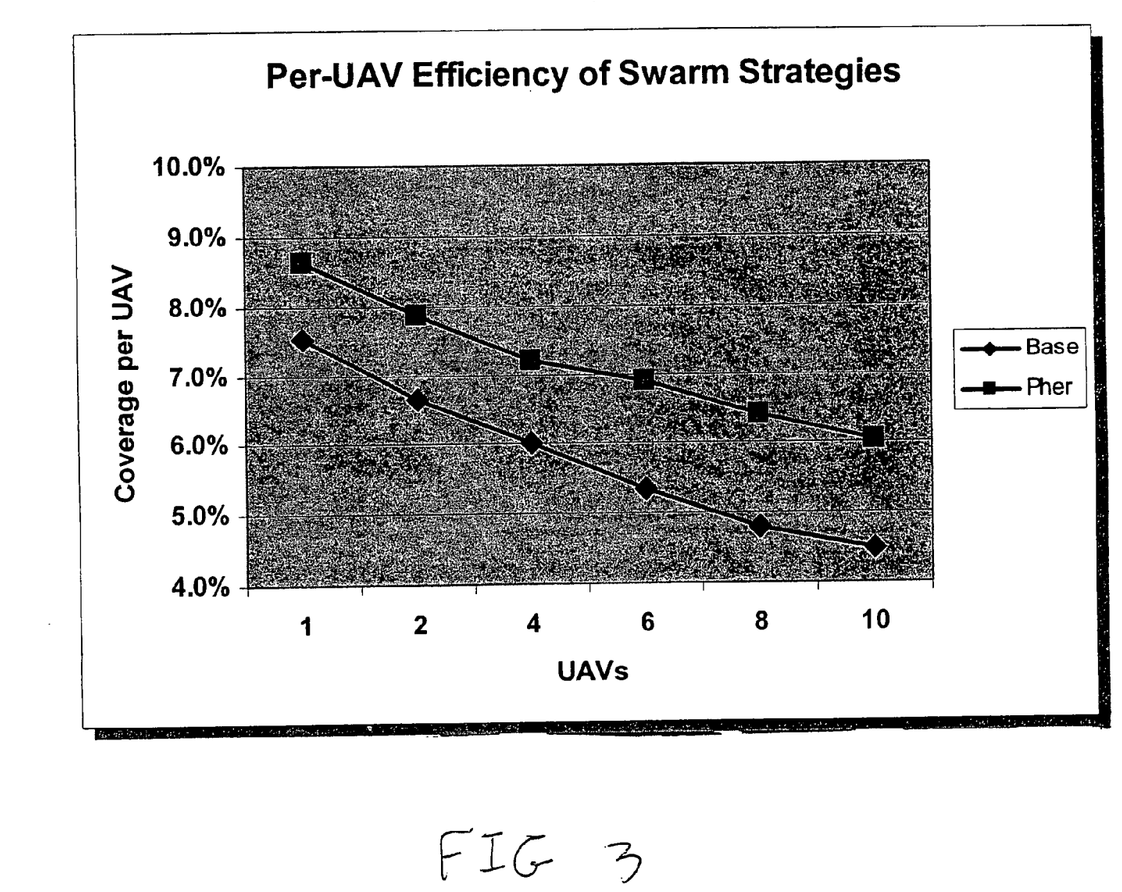
FIG. 3 is a graph comparing the performance of the baseline strategy to the trace-based strategy in controlling the movement of UAVs.

FIG. 3 shows results comparing the efficiency of two decentralized UAV movement control strategies, namely, the baseline strategy and a trace-based strategy. In the simulation performed to test the two strategies, a search area with width, length and height dimensions of 2000×2000×1000 units was used. The simulated UAVs had a maximum speed of 5 units/ time unit, with the simulation being allowed to run for a total period of 1000 time units. The number of UAVs deployed for the purposes of the testing was varied from 1 to 10. Under the simulation tests performed, a cell was considered to have been visited if it was detected by a UAV at least five times. Imposing this detection criterion was required because UAVs could detect a given cell multiple times in their sensor fields during a single pass. As previously noted, for the baseline strategy tested in the simulation, UAVs would move in straight lines until they reached the boundaries of the area, at which point they would change their direction to avoid exiting the area by randomly selecting an angle that directed them back into the area. The trace-based strategy used for the simulation involved identifying uncovered (i.e., unvisited) positions, or cells, within a small rectangular area centered around each UAV, processing the spatial coordinates of those identified uncovered cells to form a direction vector, and using the vector to direct the movement of the UAV, thereby causing the UAV to move toward areas that have a high concentration of uncovered cells.

As FIG. 3 shows, the trace-based scheme implemented performed more efficiently (in terms of coverage per UAV) than the baseline approach that was tested. Particularly, as can be seen, the coverage efficiency (i.e., the percentage of the area covered by the UAV during the simulation run) when the above-described trace-based scheme was used with a single UAV was about 8.7%, as compared to a coverage efficiency of about 7.6% when the baseline approach was used. Similarly, when ten (10) UAVs were used for the trace-based scheme, the coverage efficiency (per UAV) was about 6% as compared to a coverage efficiency of about 4.4% with the baseline approach. It is to be noted that generally for all control strategies there is a reduction in the coverage efficiency per UAV with larger swarms, although the total area covered increases as the size of the UAV swarm increases. The results of FIG. 3 thus show that trace-based, or pheromone, control strategies push UAVs to search the area in a pattern that leaves less unexplored space.

Figure 4:
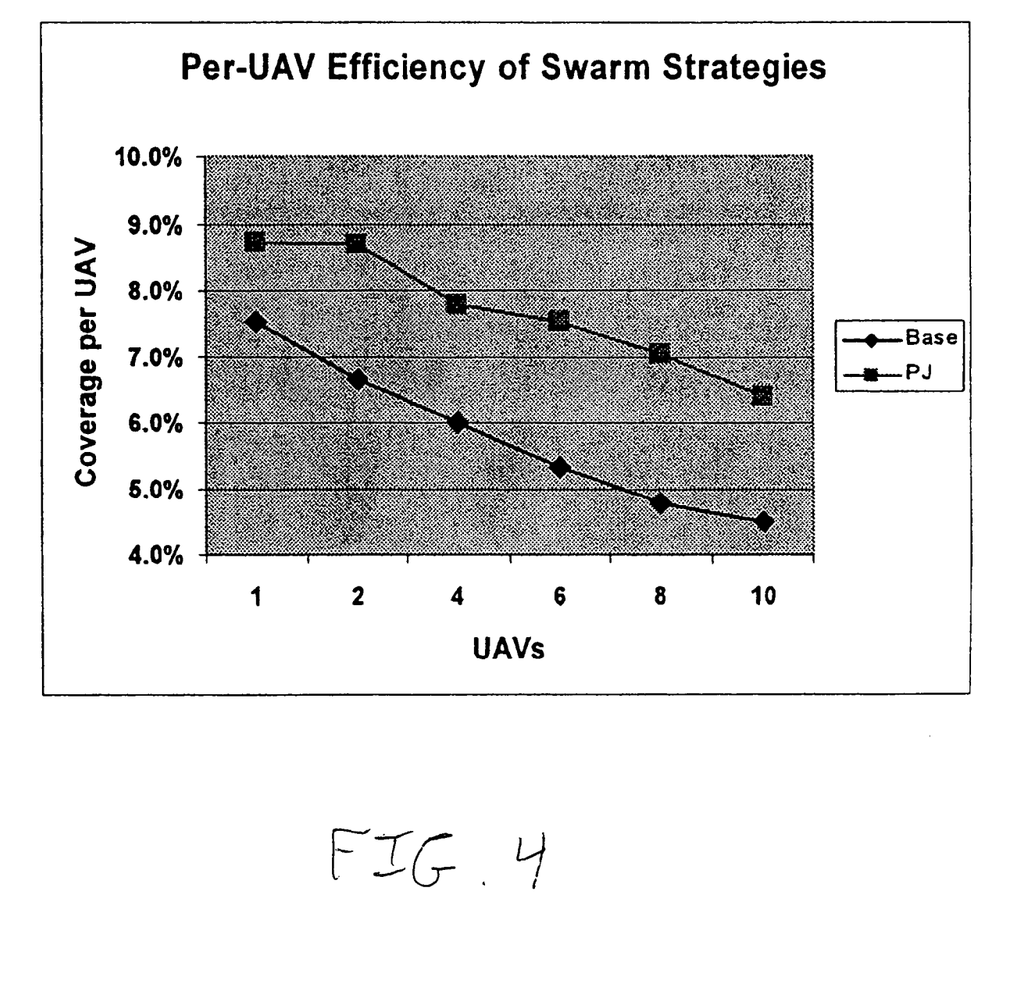
FIG. 4 is a graph comparing the performance of the baseline strategy to the combined trace-based and jitter strategy.

FIG. 4 shows the simulation results for the coverage efficiency when additional decentralized control strategies were used in conjunction with the trace-based scheme. The additional control strategy tested in the simulation corresponding to FIG. 4 was the jitter (or random) scheme, whereby a random course change of ±0-3°/time unit was made to the overall course of the UAVs used in the simulation. As FIG. 4 shows, the addition of the jitter control scheme slightly improved the results for the trace-based scheme implemented in the simulation (which was the same one used in relation to the simulation results of FIG. 3). For example, when a single UAV was used, the coverage efficiency for the trace-based and jitter control scheme (identified as the PJ, or pheromone-jitter, curve) rose to about 8.8% from the 8.7% efficiency shown in FIG. 3, and when two UAVs were used, the coverage efficiency for the trace-based and jitter control scheme rose to about 8.8% from the 7.9% efficiency of FIG. 3. Although not shown, simulation results for the efficiency performance when the baseline approach was combined with additional control schemes did not result in any significant performance improvements.

Figure 5:
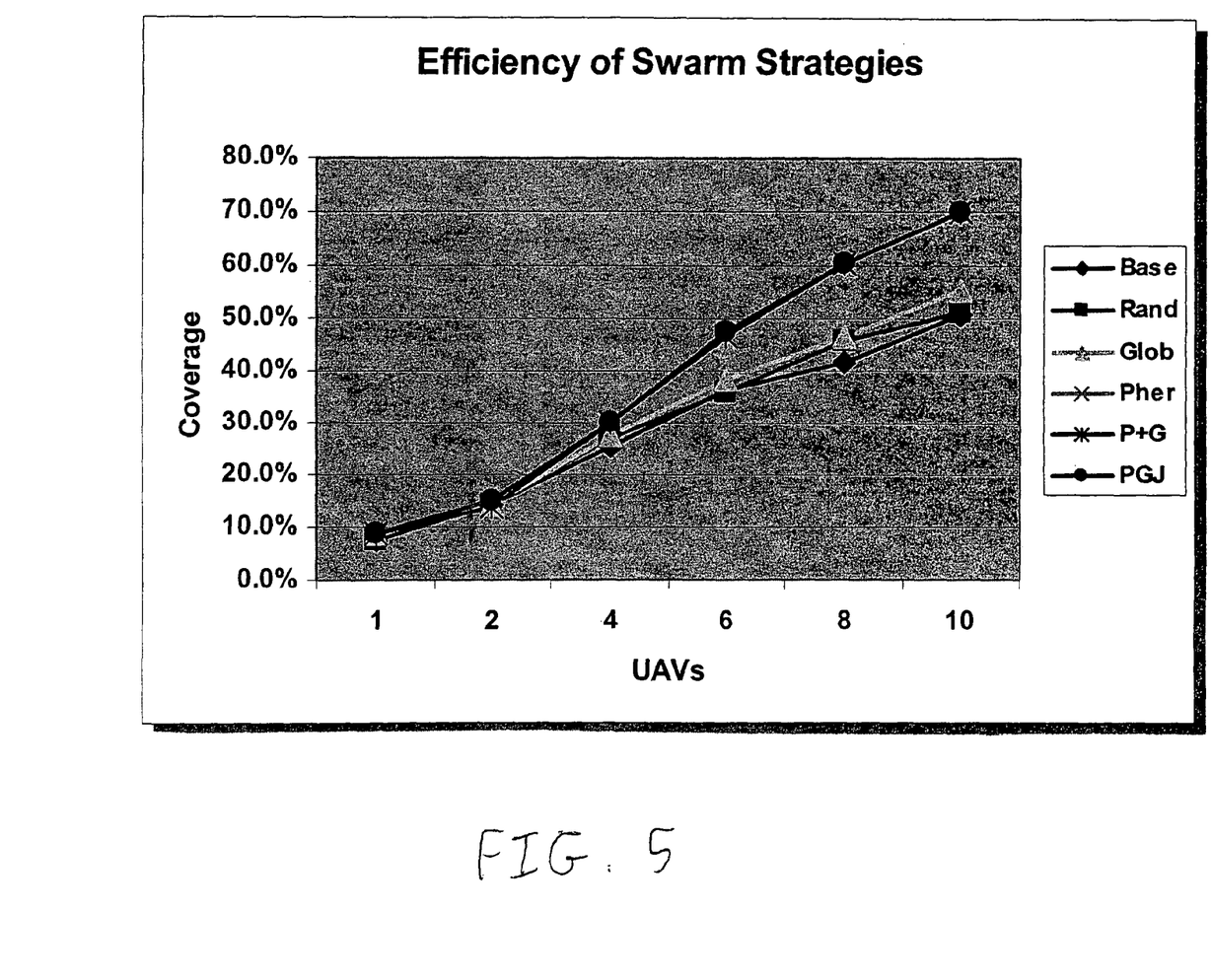
FIG. 5 is a graph comparing the performance of several types of control strategies in controlling the movement of UAVs.

FIG. 5 compares the performance results for various types of control strategies. The graph shown in FIG. 5 compares the performances (in terms of the percentage of the area covered during the simulation run) of the baseline scheme, random scheme, global scheme (in which a local trace-based scheme is not used once the UV arrives at a selected sector), trace-based (or pheromone) scheme described in relation to FIG. 3, combined trace-based and global scheme (i.e., a scheme in which a UAV determines a sector it should search, and subsequently searched that sector using the trace-based technique), and trace-based and global scheme combined with a jitter strategy. As can be seen, the trace-based (i.e., pheromone-based) strategies were considerably more efficient than other decentralized strategies. Moreover, the fact that, as can be seen in the graph of FIG. 5, the trace-based control schemes were substantially overlapping shows that it was the trace-based component of the scheme, operating at the local level (i.e., as opposed to the global scheme), that is primarily responsible for the improved performance efficiency of the tested trace-based schemes.

Thus, the simulation results of FIGS. 3-5 show that trace-based strategies, in which UAVs use traces (i.e. pheromones) to determine positions that have been previously searched and direct the UAVs accordingly, may be more efficient than other decentralized strategies for controlling the motion of UAVs.

The methods and systems described herein may offer numerous advantages over alternative search methods:

These methods may scale favorably with the number of UAVs: each UAV may only need to send and receive a small amount of information about its surrounding area.

These methods may be highly robust to noise and temporary failures in the communications system: if information transfer fails at one time step, the UAVs can continue to fly based on their existing information until additional data are received from the central operator. In the event that communications fail completely, each UAV can still fly a predefined pattern, and the plurality of UAVs will simply carry out the search task in parallel, without collaboration.

These methods may be highly robust to failure of any individual UAVs: each UAV may adjust its flight pattern based on information provided, for example, by the central operator, which is based on the accumulation of information from all other active UAVs. If a UAV should fail, its information will simply no longer be added to the overall matrix by the central operator. In the event that all but one UAV fail, that UAV will fly on a pattern influenced only by its own past history.

Although the methods and systems have been described relative to specific embodiments thereof, they are not so limited. Obviously many modifications and variations may become apparent in light of the above teachings. For instance, the same approach could be used for unmanned ground vehicles (UGVs) or unmanned underwater vehicles (UUVs); different sensor types could be employed for target detection, including but not limited to vision, radar, magnetic, ultrasonic, infrared or others; the format and amount of data stored by the central operator can vary; and the communications systems can be effected through radio, satellite, visual (line-of-sight) or other systems.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer (s), workstation personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Use of such "microprocessor" or "processor" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products and also proprietary databases, and may also include other structures for associating memory such as links, queues, graphs, trees, with such structures provided for illustration and not limitation.

References to a network, unless provided otherwise, can include one or more intranets and/or the internet. References herein to microprocessor instructions or microprocessor-executable instructions, in accordance with the above, can be understood to include programmable hardware.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun can be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, can be understood to so communicate, be associated with, and or be based on in a direct and/or indirect manner, unless otherwise stipulated herein.

Many additional changes in the details, materials, and arrangement of parts, herein described and illustrated, can be made by those skilled in the art.

What is claimed is:

1. A method for controlling movement of a first unmanned vehicle (UV) to search an area, the method comprising:
    generating a first trace associated with prior positions in which the first UV has been located at prior times;
    changing with time a digital signal associated with said first trace;
    receiving data relating to at least one additional UV, wherein for each additional UV the data comprises an additional trace generated by said UV associated with prior positions in which said additional UV has been located at prior times, and an identity of said additional UV;
    determining a direction in which the first UV is to move using said first generated trace and at least one said additional trace;
    causing the first UV to move in the determined direction; and
    conducting at least one search,
    wherein no UV is in a master/slave relationship to another UV in determining the direction; and
    wherein the digital signal comprises a numerical value associated with a prior position in which the first UV has been located at a prior time, and wherein that value is reduced as a function of a time that has elapsed since the first UV has been located at said prior position.

2. The method of claim 1, wherein determining the direction comprises establishing a new position toward which the first UV is to move, and wherein causing the first UV to move comprises causing the first UV to move toward the new position.

3. The method of claim 1, further comprising detecting conditions associated with prior positions in which the first UV has been located at prior times, and wherein said first trace represents said detected conditions at the associated prior positions.

4. The method of claim 3, wherein the detected conditions at said associated prior positions include at least one of: detected threats, and detected targets.

5. The method of claim 1, further comprising generating an additional trace associated with additional positions in which the first UV has been located, said additional trace indicating that the additional positions have been searched.

6. The method of claim 1 further comprising transmitting the generated first trace to a central operator.

7. The method of claim 1, wherein the data relating to the at least one additional trace is received from a central operator.

8. The method of claim 1, further comprising detecting a target in the search, and at least one of: attacking the target detected in the search, tracking the target, and assessing the condition of the target.

9. The method of claim 1, wherein determining the direction is further based on responding to a request from a second UV to join that UV.

10. A method for controlling movement of a first unmanned vehicle (UV) to search an area, the method comprising:
    generating a first trace associated with prior positions in which the first UV has been located at prior times;
    receiving data relating to at least one additional UV, wherein for each additional UV the data comprises an additional trace generated by said UV associated with prior positions in which said additional UV has been located at prior times, and an identity of said additional UV;

determining a direction in which the first UV is to move using said first generated trace and at least one said additional trace;

causing the first UV to move in the determined direction; and conducting at least one search, wherein no UV is in a master/slave relationship to another UV in determining the direction;

wherein determining the direction is further based on a decentralized control strategy; and wherein the decentralized control strategy includes at least one of: baseline strategy, random strategy, repulsion strategy, and global strategy.

11. The method of claim 10, wherein determining the direction comprises identifying a position that is not associated with any trace.

12. The method of claim 10, wherein determining the direction comprises identifying a position, and, for each trace associated with that position, comparing a current time with a time at which the trace was generated in association with that position to determine that that position has not been searched by a UV for a pre-determined period of time.

13. The method of claim 10, wherein the decentralized control strategy is a baseline strategy.

14. The method of claim 10, wherein the decentralized control strategy is a random strategy.

15. The method of claim 10, wherein the decentralized control strategy is a repulsion strategy.

16. The method of claim 10, wherein the decentralized control strategy is a global strategy.

17. A method for controlling movement of a subject unmanned vehicle (UV) which is among a plurality of unmanned vehicles (UVs) to search an area, the method comprising:

generating traces associated with at least some of the plurality of UVs, each of the traces associated with prior positions at which a corresponding UV has been located at prior times;

changing with time digital signals associated with each of said traces;

receiving at the subject UV data associated with at least some of the generated traces associated with the plurality of UVs;

determining a direction in which the subject UV is to move using at least some of the received data and the trace associated with the subject UV, and causing the subject UV to move in the determined direction;

wherein no UV is in a master/slave relationship to another UV in determining the direction, and wherein each digital signal comprises a numerical value associated with a prior position in which a UV has been located at a prior time, that is reduced as a function of a time that has elapsed since the said UV has been located at said prior position.

18. The method of claim 17 further comprising:

receiving at a central operator the traces associated with at least some of the plurality of UVs, and transmitting from the central operator to the subject UV data associated with the received traces.

19. The method of claim 17, further comprising detecting conditions associated with prior positions in which at least one of the plurality of UVs has been located at prior times, and wherein at least one of said traces represents said detected conditions at the associated prior positions.

20. The method of claim 19, wherein the detected conditions at said associated prior positions include at least one of: detected threats, and detected targets.

21. The method of claim 17, wherein determining the direction comprises identifying a position that is not associated with any trace.

22. The method of claim 17, wherein determining the direction comprises identifying a position and, for each trace associated with that position, comparing a current time with a time at which said trace was generated in association with that position to determine that that position has not been searched by a UV for a pre-determined period of time.

23. A system for controlling movement of a first unmanned vehicle (UV) to search an area, the system comprising:

a trace generator for generating a first trace associated with prior positions in which the first UV has been located at prior times;

a processor for changing with time a digital signal associated with said first trace;

a communications receiver for receiving data relating to at least one additional UV, wherein for each additional UV the data comprises an additional trace generated by said UV associated with prior positions in which said additional UV has been located at prior times, and an identity of said additional UV, a search module for conducting at least one search;

a navigation module for determining a direction in which the first UV is to move using said first generated trace and at least one said additional trace; and a propulsion module for causing the first UV to move in the determined direction;

wherein no UV is in a master/slave relationship to another UV in determining the direction; and wherein the digital signal comprises a numerical value associated with a prior position in which the first UV has been located at a prior time, and wherein that value is reduced as a function of a time that has elapsed since the first UV has been located at said prior position.

24. The system of claim 23, wherein determining the direction comprises establishing a new position toward which the first UV is to move, and wherein causing the first UV to move comprises causing the first UV to move toward the new position.

25. The system of claim 23, wherein said trace generator further is for generating an additional trace associated with additional positions in which the first UV has been located, said additional trace indicating that the additional positions have been searched.

26. The system of claim 23, wherein determining the direction comprises identifying a position that is not associated with any trace.

27. A system for searching an area, the system comprising:

a plurality of unmanned vehicles (UVs), wherein each of said plurality of UVs comprises:

a trace generator for generating a trace associated with said UV, the trace associated with prior positions at which said UV has been located at prior times;

a communications transmitter/receiver for transmitting to at least some other of said plurality of UVs data associated with the generated trace associated with said UV and receiving data associated with at least some of the generated traces associated with at least some other of said plurality of UVs;

at least one processor for changing with time digital signals associated with each of said traces;

a navigation module for determining a direction in which said UV is to move using at least some of the received data and the trace associated with said UV, and a propulsion module for causing said UV to move in the determined direction;

wherein no UV is in a master/slave relationship to another UV in determining the direction; and wherein the digital signal comprises a numerical value associated with a prior position in which an UV has been located at a prior time, that is reduced as a function of a time that has elapsed since the said UV has been located at said prior position.

28. The system of claim 27, further comprising:

a central operator that receives traces associated with at least some of said plurality of UVs, and transmits to at least some of said plurality of UVs data associated with at least some of the received traces associated with other of said plurality of UVs.

29. The system of claim 27, wherein at least some of said plurality of UVs further comprise a sensor for detecting conditions associated with positions at which said UV has been located at prior times, and wherein at least one of said traces represents said detected conditions at the associated prior positions.

30. The system of claim 29, wherein the detected conditions at said associated prior positions include at least one of: detected threats, and detected targets.

31. The system of claim 27, wherein determining the direction comprises identifying a position that is not associated with any trace.

32. The system of claim 27, wherein determining the direction comprises identifying a position and, for each trace associated with that position, comparing a current time with a time at which said trace was generated in association with that position to determine that that position has not been searched by a UV for a pre-determined period of time.

* * * * *